(12) United States Patent
Tatina

(10) Patent No.: US 7,632,052 B2
(45) Date of Patent: Dec. 15, 2009

(54) VEHICLE TIRE TIE-DOWN SYSTEM AND METHOD

(75) Inventor: Richard A. Tatina, Countryside, IL (US)

(73) Assignee: Portec Rail Products Inc., Pittsburgh, PA (US)

( * ) Notice: Subject to any disclaimer, the term of this patent is extended or adjusted under 35 U.S.C. 154(b) by 407 days.

(21) Appl. No.: 11/623,768

(22) Filed: Jan. 17, 2007

(65) Prior Publication Data

US 2008/0170923 A1 Jul. 17, 2008

(51) Int. Cl.
*B60P 3/06* (2006.01)

(52) U.S. Cl. .............................. 410/20; 410/12; 410/19

(58) Field of Classification Search ...................... 410/2, 410/3, 7, 8, 9, 10, 11, 12, 19, 20, 23, 30, 410/50, 98, 97, 100, 103

See application file for complete search history.

(56) References Cited

U.S. PATENT DOCUMENTS

| | | | |
|---|---|---|---|
| 5,302,063 A | | 4/1994 | Winsor |
| 5,312,213 A | * | 5/1994 | Winsor ........................... 410/9 |
| 5,316,421 A | | 5/1994 | Bullock et al. |
| 6,171,037 B1 | * | 1/2001 | Andre .......................... 410/20 |
| 6,530,729 B2 | | 3/2003 | Tatina |
| 7,004,696 B2 | * | 2/2006 | Anderson et al. ............. 410/30 |
| 7,025,545 B1 | * | 4/2006 | Robison ....................... 410/20 |
| 2002/0197126 A1 | * | 12/2002 | Tatina ........................... 410/7 |

\* cited by examiner

*Primary Examiner*—Patricia L Engle
(74) *Attorney, Agent, or Firm*—Schiff Hardin LLP

(57) ABSTRACT

A vehicle tire tie-down winch and chock assembly ties down at least one tire of a vehicle on a load carrying platform with a tire harness. The load carrying platform has at least one raised rib with elongated apertures at a top surface of the rib. The assembly has a chock surface and a rotating lock mechanism with an elongated lock element which in an insertion position fits within one of the apertures in the rib and in a locking position has its longitudinal extent substantially perpendicular to a longitudinal extent of the elongated aperture to engage the aperture. At least one hook is engageable in another of the elongated apertures of the rib or in an elongated aperture of another rib at the platform. A winch is provided on the assembly which secures to an end of the tire harness. The winch may have a foot pedal release.

22 Claims, 6 Drawing Sheets

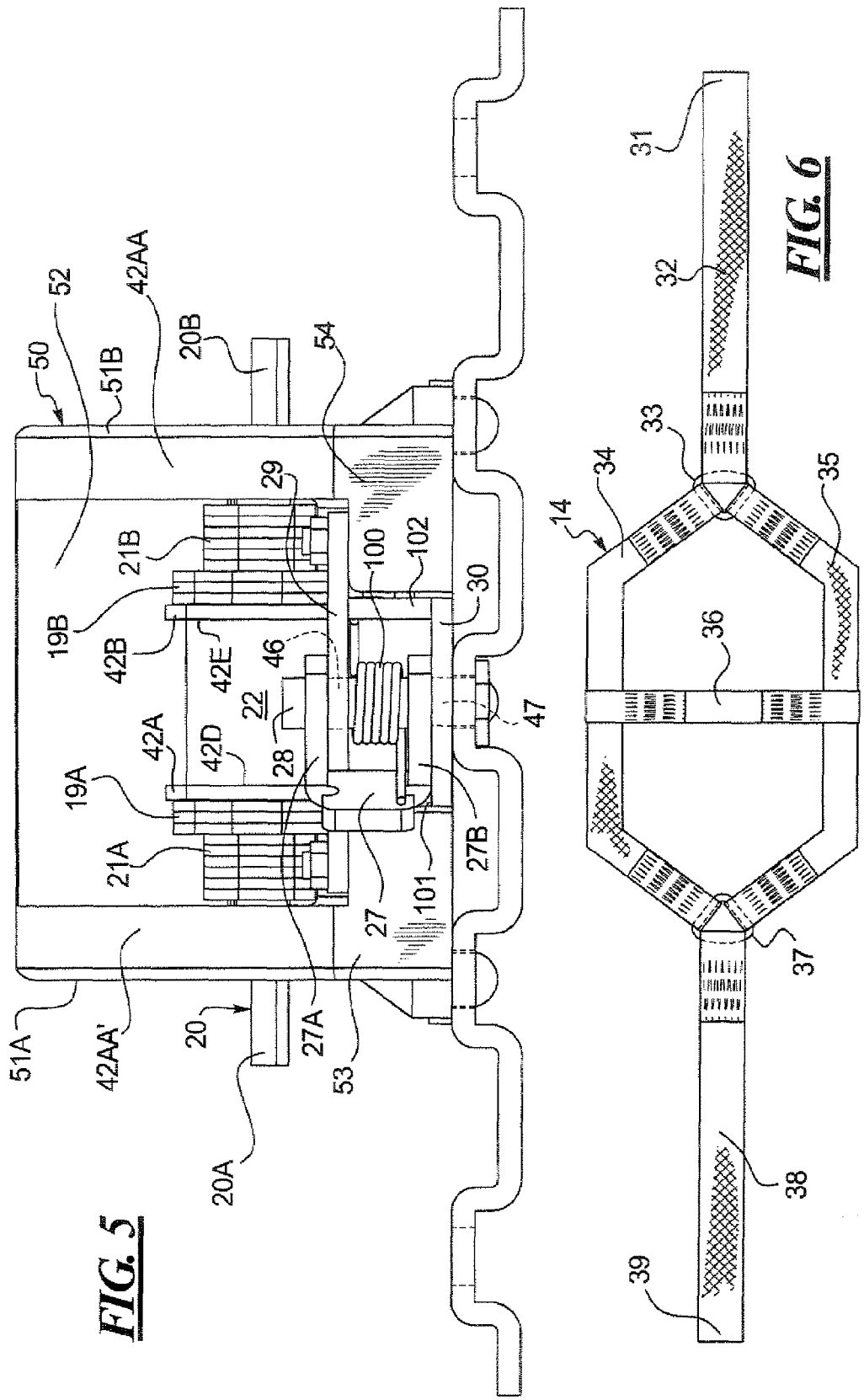

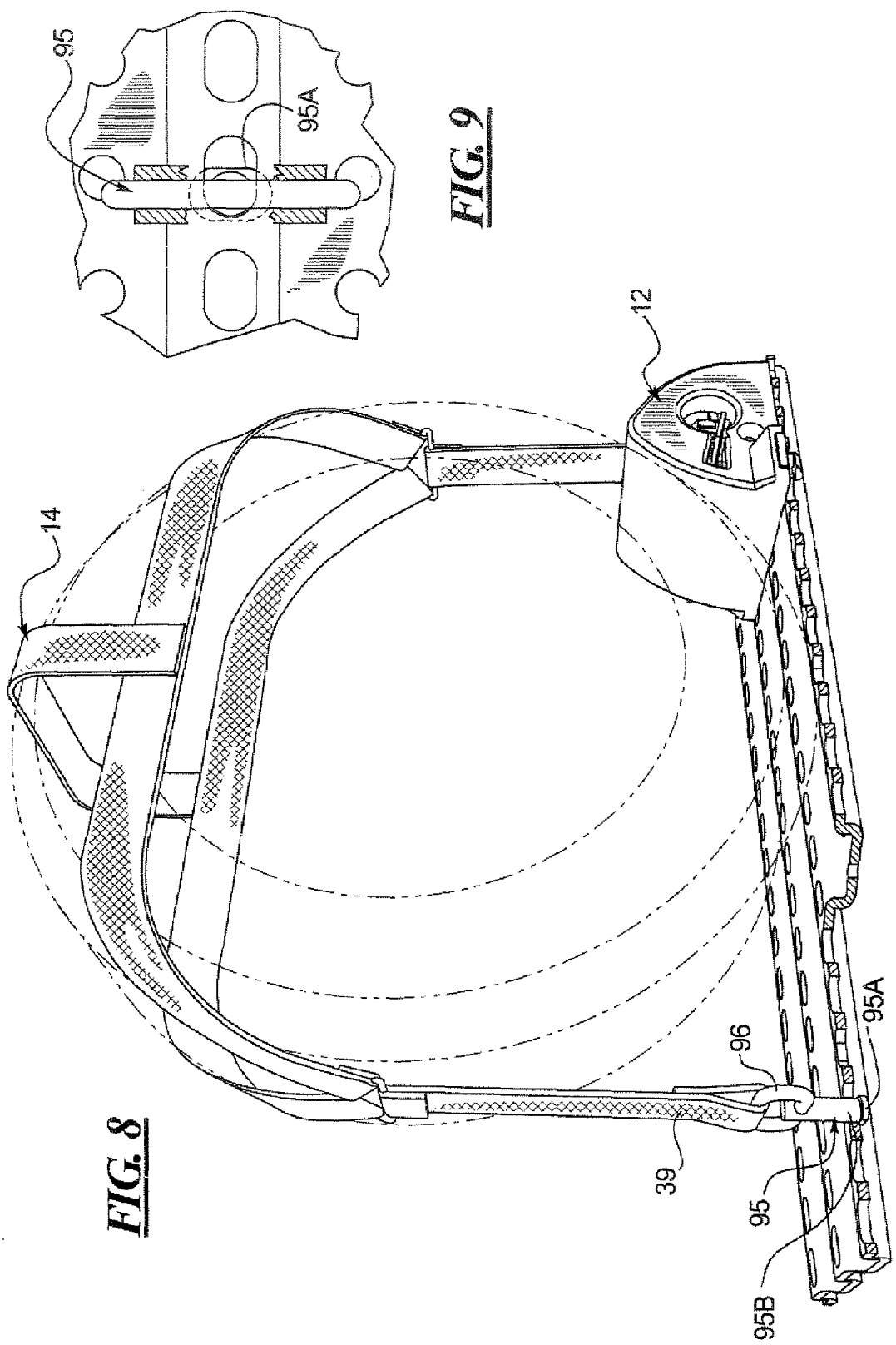

VEHICLE TIRE TIE-DOWN SYSTEM AND METHOD

BACKGROUND

Frequently it is necessary to secure a vehicle onto the flatbed of a load carrying platform such as a railcar.

Previously, it has been known to secure a vehicle onto the railcar load carrying platform by preventing the movement of the wheels through use of chocks which are placed at one or both ends of one or more tires of the vehicle. It has also been known to use a tire harness positioned over and around a portion of the tire, with ends of the harness connected to the chocks. Previous prior art systems are expensive to manufacture, difficult to use, and, in some cases, require twists in the webbing of the securing harness, and are difficult to install. Furthermore, the prior art systems are subject to potential failure.

In a previous patent by the same inventor herein, U.S. Pat. No. 6,530,729, a system and method is disclosed employing anchor channels in a load carrying platform and having first and second upper flanges over the respective channels. Notches are provided in the first and second upper flanges of the anchor channels. Right- and left-handed integral winch and chock assemblies are provided, each of the assemblies having a rotating lock mechanism for engaging the flanges of a channel and comprising a rotatable plate in the shape of a rectangle. Spaced lugs are provided on the right and left hand winch and chock assemblies. The winch and chock assemblies are aligned at both ends of the tire and the respective lugs are aligned so that the lugs fit within the respective notches at a desired location on one of the anchor channels. The lock mechanism is then rotated to rotate the rectangular plate to lock the respective winch and chock assemblies to the anchor channel. The lock mechanism provided a vertical restraint, and the lugs in combination with the notches and the anchor channel provided a longitudinal restraint, for the respective first and second winch and chock assemblies. One end of the tire harness is then connected to a mandrel of one of the winch and chock assemblies and the other end is connected to a mandrel of the other winch and chock assembly. The mandrel of one or both of the winch and chock assemblies are then turned to tighten the harness on the tire,

SUMMARY

It is an object to improve upon the vehicle tire tie-down system and method described above in U.S. Pat. No. 6,530,729.

A vehicle tire tie-down winch and chock assembly ties down at least one tire of a vehicle on a load carrying platform with a tire harness. The load carrying platform has at least one raised rib with elongated apertures at a top surface of the rib. The assembly has a chock surface and a rotating lock mechanism with an elongated lock element which in an insertion position fits within one of the apertures in the rib and in a locking position has its longitudinal extent substantially perpendicular to a longitudinal extent of the elongated aperture to engage the aperture. At least one hook is engageable in another of the elongated apertures of the rib or in an elongated aperture of another rib at the platform. A winch is provided on the assembly which secures to an end of the tire harness. The winch may have a foot pedal release.

BRIEF DESCRIPTION OF THE DRAWINGS

FIG. 5 is an end view of the winch and chock assembly secured to the platform;

FIG. 6 is a top view of the tire harness used in the vehicle tire tie-down system of FIG. 1;

FIG. 8 is a side view of an alternative embodiment wherein only one winch and chock assembly is provided at a right end of the harness to the right of the tire and at the other left end of the harness to the left of the tire a T hook is provided for connection to the load carrying platform; and FIG. 9 is a top view showing the T hook engaged in one of the slots of one of the ribs of the platform.

DESCRIPTION OF THE PREFERRED EMBODIMENT

Figure 1:
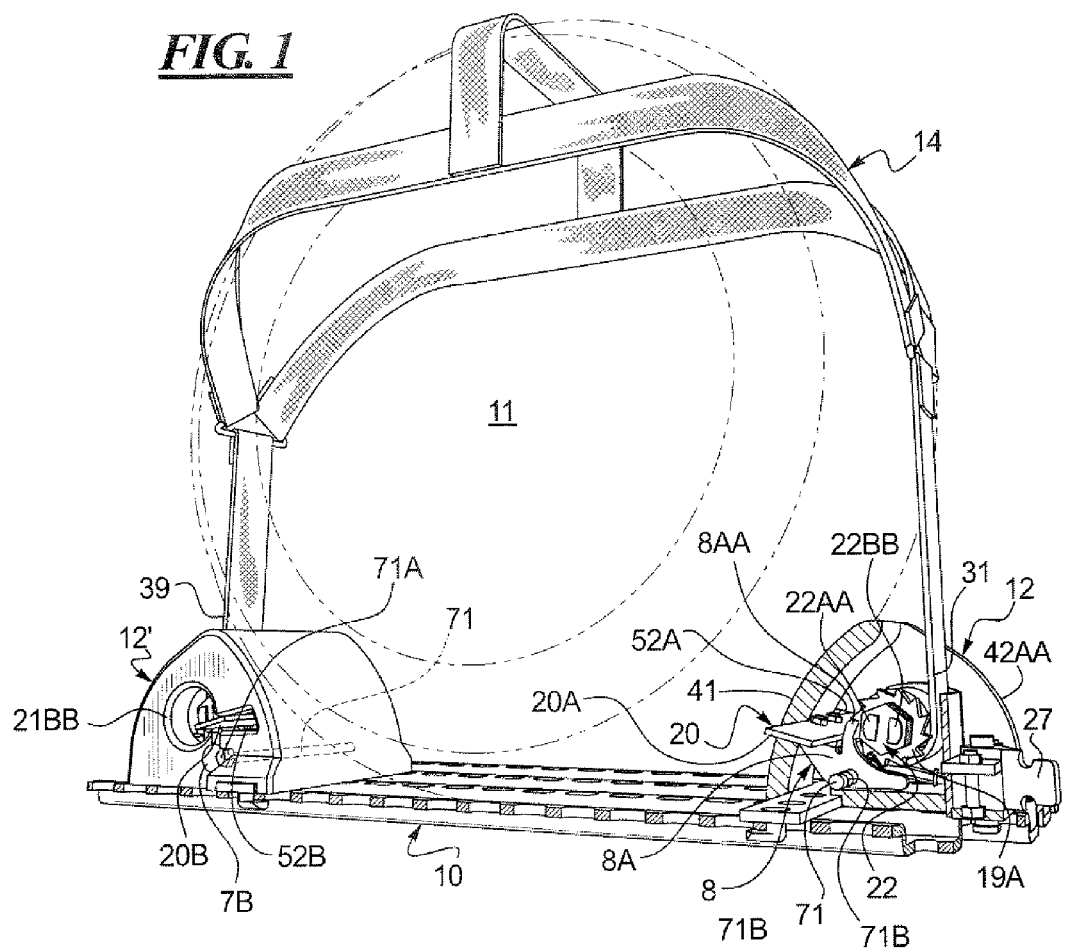
FIG. 1 is a fragmentary perspective side view showing the improved vehicle tire tie-down system and method.

For the purposes of promoting an understanding of the principles of the invention, reference will now be made to the preferred embodiment illustrated in the drawings and specific language will be used to describe the same. It will nevertheless be understood that no limitation of the scope of the invention is thereby intended, and such alterations and further modifications in the illustrated device and such further applications of the principles of the invention as illustrated as would normally occur to one skilled in the art to which the invention relates are included.

The improved vehicle tire tie-down system and method of the preferred embodiment is generally illustrated in FIG. 1. A load carrying platform 10 such as on a railcar or other load carrying vehicle such as a truck, airplane or the like, supports a vehicle to be transported. One of the tires of such a vehicle is shown as an example as item 11 in FIG. 1. It is of course understood that one or more of the tires of the vehicle to be secured to the platform may be anchored as explained with the tie-down system of the preferred embodiment.

A winch and chock assembly 12 is provided at the right end of the tire 11 and another identical winch and chock assembly 12' is provided at the left end of the tire 11. A tire harness 14, details of which are shown in FIG. 6 described hereafter, wraps around the tire. The assembly 12 at the right of the tire secures the end 31 of the tire harness 14 and the assembly 12' at the left end of the tire secures the opposite end 39 of the tire harness 14. A mandrel 22 of a winch of the assembly 12 or 12' may be cranked to tighten the tire harness around the wheel. The assembly 12 also has a respective curved chock surface 41 so that assembly 12 not only provides a winch for tightening the tire harness but simultaneously provides a chock at an end of the tire. A rounded edge surface 42AA, 42AA' is positioned opposite the chock surface 41 at both sides of the assembly with a large cutout or access 52 to an accessible interior region between these surfaces (see FIG. 5).

Figure 2:
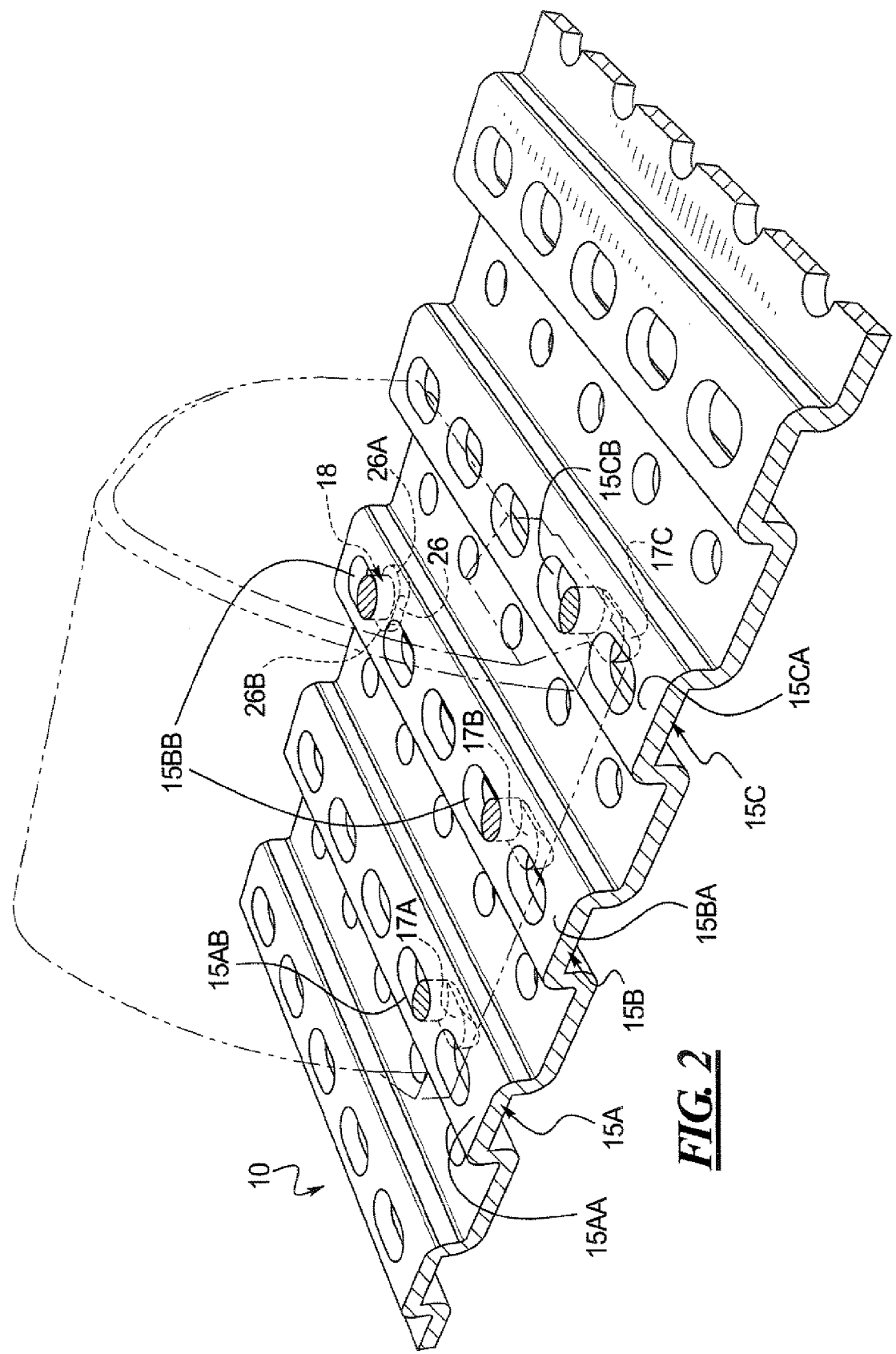
FIG. 2 is a perspective view of the load carrying platform with a winch and chock assembly shown schematically in dashed lines at the right end of the tire.

A plurality of anchor ribs such as 15A, B, C (FIG. 2) in the platform 10 create a corrugation effect. As shown in FIG. 2, rib 15A has a top surface 15AA with a plurality of spaced elongated retaining apertures 15AB in the top surface. The respective winch and chock assemblies 12 and 12' are placed onto the ribs 15A, B, C such that respective hooks 17A, 17B, 17C engage in respective elongated apertures 15AB, 15BB, and 15CB in the respective ribs 15A, 15B, and 15C when the assemblies 12 and 12' are positioned at both ends of the tire with respective chock surfaces in contact or close to contact with the tire.

Figure 3:
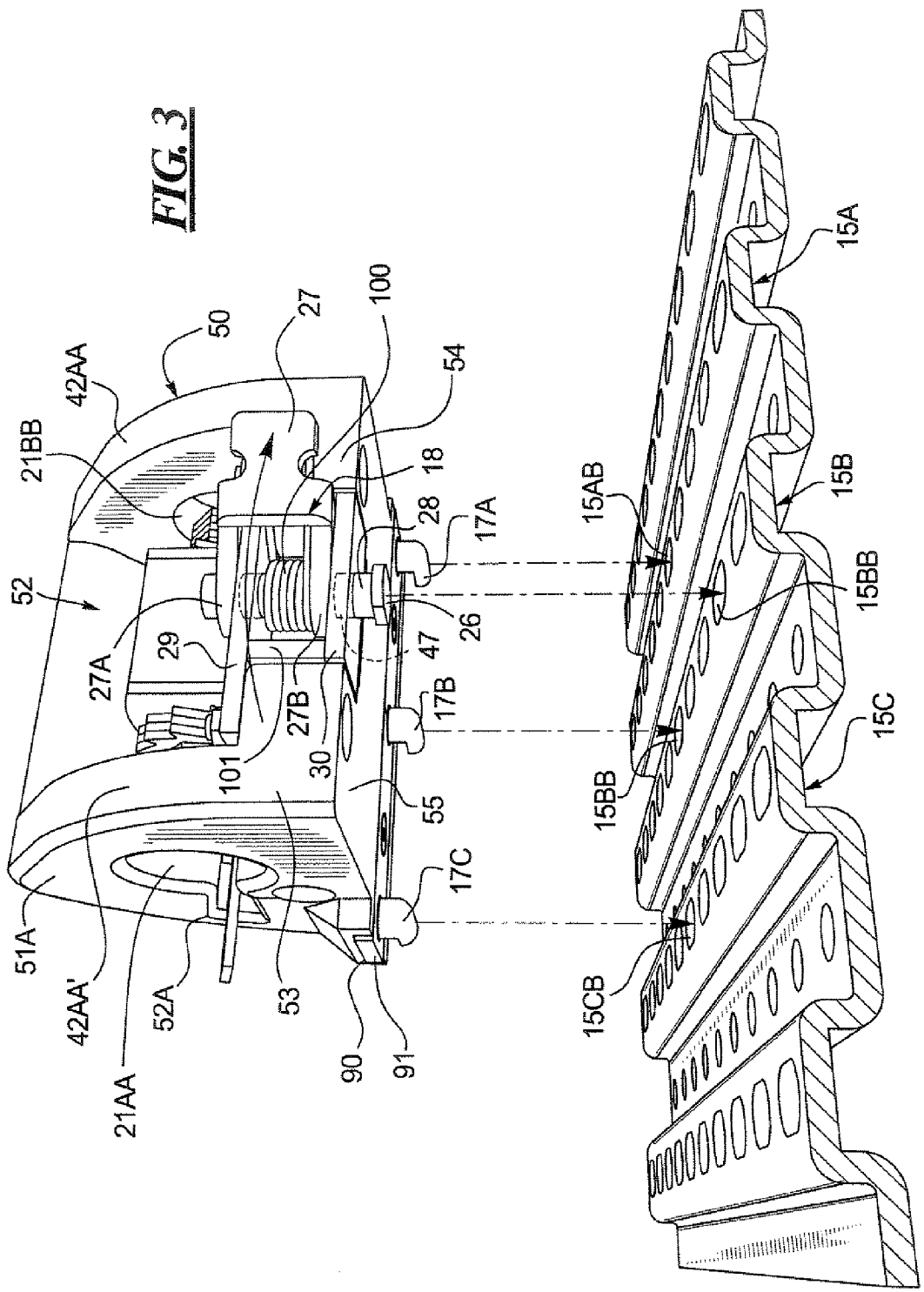
FIG. 3 is a perspective view of the winch and chock assembly viewed toward the bottom thereof.

As shown in FIGS. 2 and 3, a lock mechanism 18 is provided and is formed of an elongated rotatable lock element 26 with rounded ends 26A, 26B having an overall shape similar to the elongated apertures 15AB, 15BB, and 15CB in the respective top surfaces 15AA, 15BA, and 15CA of the respective ribs 15A, 15B, and 15C. When a spring-loaded lock handle 27 is pushed to the right (see FIG. 3), the winch and chock assembly 12 can be placed onto the ribs 15A, B, C since the longitudinal extent of the lock element 26 is then aligned with a longitudinal extent of one of the elongated apertures 15BB of the rib 15B when the hooks 17A, B, C are engaged in respective other elongated apertures 15AB, 15BB, and 15CB. Spring loaded lock handle 27 is then released (or shown in FIGS. 1 and 4) and the lock element 26 rotates 90° so that its longitudinal extent is now perpendicular to the longitudinal extent of the respective elongated aperture 15BB. Thus the assembly 12 is now in a loaded position with the lock element together with the hooks preventing longitudinal, lateral, or vertical movement of the assembly 12.

Figure 7:
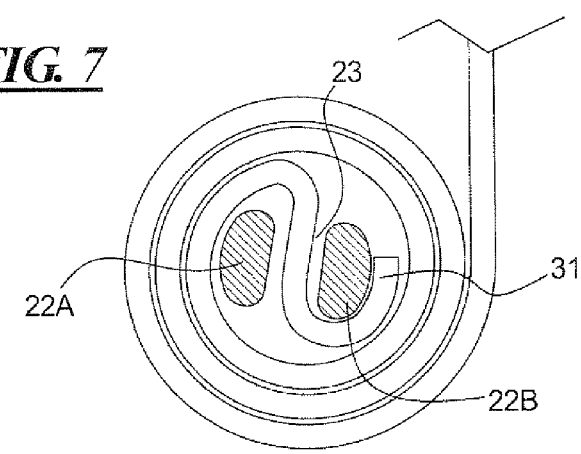
FIG. 7 is a fragmentary end view of an end of the harness connected to the mandrel of the winch and chock assembly at the right end of the tire in FIG. 1.
Figure 4:
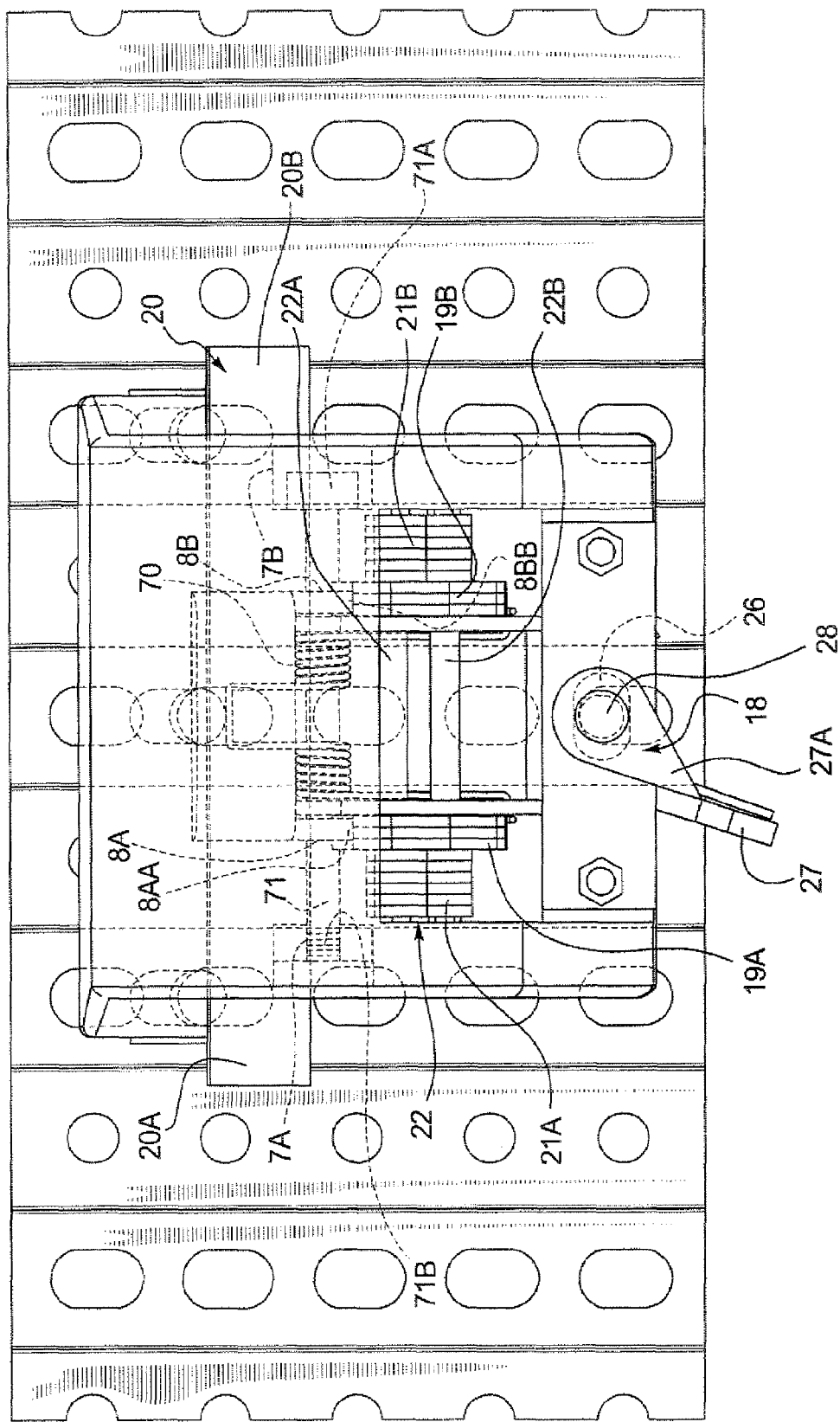
FIG. 4 is a top view of the winch and chock assembly on the platform but without the tire shown for clarity.

As shown in FIGS. 4 and 5, ratchet wheels 19A and 19B are provided which cooperate with a U-shaped pawl member 8 connected to a foot bar 20 having at outer ends respective foot pedals 20A and 20B (FIGS. 4 and 5) extending through respective slots 52A and 526 (FIG. 1) in each of the opposing side walls 51A, B of a casing 50 of the assembly 12. When a drive nut 21A or 21B is engaged with a corresponding socket wrench type drive tool, the ends of the tire harness are then tightened onto the respective mandrels 22 of each of the assemblies 12 and 12'. The mandrel 22 is formed of opposing rods 22A, B (FIGS. 4 and 7). Each rod has an outer rounded winding surface and an inner flat surface so that a slot 23 is formed between the opposing flat surfaces.

Each end of the mandrel 22 has the respective drive nut 21A or 21B accessible through a respective drive aperture 21AA or 21BB (FIG. 3) in the opposing sidewalls 51A or 51B of the casing 50. The free ends 31 and 39 of the web harness 14 may be inserted through the respective slots 23 of each mandrel so that when the respective mandrel is rotated, the ends 31 or 39 of the web harness are trapped by an over-wrap as shown in FIG. 7.

As shown in FIGS. 1, 3 and 5, the lock mechanism 18 has the handle 27 secured by ears 27A and 27B to a rotatable spring-loaded tubular member 28 which in turn is received at its end in apertures 46 and 47 in plates 29 and 30 as shown in FIGS. 3 and 5. the spring loading is achieved with spring 100. The plates 29 and 30 are attached by sidewalls 101 and 102.

The winch and chock assembly 12 has a U-shaped assembly having an end plate and two vertically spaced walls 42A and 42B which support the mandrel 22 via respective apertures 42D and 42E. The walls 42A and 42B are mounted with the end plate to top retaining plate 29 for the lock mechanism. Other configurations may be appreciated by those skilled in the art representing some variation from the above for supporting the mandrel. The same is true of the ratchet wheels and wherein other types of winding mandrel systems and other types of locking mechanisms may be utilized as known by those skilled in the art.

As shown in FIGS. 3 and 5, the winch and chock assembly 12 has the outer casing 50, such as of aluminum or plastic, for example. This outer casing 50 has at its side facing the tire the chock surface 41 and the rear rounded surfaces 42AA and 42AA' having a large access cut-out 52 to the interior region. Also support steps 53 and 54 are provided near a bottom 55 of the casing. The support steps support the top plate 29, which is longer than the bottom retaining plate 30 which fits between the steps 53 and 54.

The ratchet wheels 19A, 19B may be solid or preferably formed of a plurality of plates. Similarly the drive nuts 21A or 21B at opposite ends of the mandrel 22 may be formed solid or of a plurality of plates. The opposing rods 22A, B forming the mandrel pass through openings in the drive nuts and are flattened at the ends 22AA and 22BB at each end of the mandrel 22 like a rivet head (see FIG. 1) to retain the entire mandrel with its ratchet wheels and drive nuts as an overall assembly.

The side walls 51A and 51B of the casing 50 supporting the mandrel 22 also support a pivot bolt 71 spring loaded with a spring 70 (FIG. 4). The pivot bolt 71 is mounted at its head 71A in a respective aperture 7B in wall 51B. A threaded end 71B is received in a threaded aperture 7A in wall 51A of the casing 50.

The common foot bar 20 is connected to the U-shaped pawl member 8 and has side walls 8A and 8B with respective pawl fingers 8AA and 8BB, and which is biased by a tab of the spring 70.

As shown in FIG. 3, a channel 90 is provided in the base or bottom 55 of the casing 50 to receive a hook retaining plate 91 which supports each of the hooks 17A, 17B and 17C. This plate 91 is retained to the casing by respective screws.

Although the lock element 26 has been shown in one preferred embodiment, other shapes of the lock element 26 may be provided and other types of hand mechanisms or levers may be used in conjunction with the lock element as may be appreciated by those skilled in the art.

As shown in FIG. 6, the tire harness 14 has a central wrap-around web 36 positioned between two half loop webs 34 and 35 These half loop webs are attached to respective three-sided rings 33 and 37 such as in the form of a triangle, for example. An end web 32 and an end web 38 are provided having the respective free ends 31 and 39. As shown in FIG. 7, these respective ends are attached to the respective mandrels 22 of the respective right and left winch and chock assemblies 12 and 12' of FIG. 1. FIG. 7 shows the mandrel for the right assembly 12.

FIG. 8 illustrates an alternate embodiment in which only one of the two winch and chock assemblies is provided, such as the right end winch and chock assembly 12, for example. In this case, the other end 39 of the harness is attached by a loop 96 to an engagement member comprising a T-shaped hook 95 which has a vertical pillar 95B with an engagement element 95A at a bottom end with a longitudinal extent, and which, when aligned with an elongated aperture in one of the ribs, passes therethrough and then is turned 90° so as to lock in the elongated aperture or slot. This eliminates the need for another wheel chock for a given tire and reduces costs and increases vehicle securement efficiency.

FIG. 9 shows a top view of the T-shaped hook 95 locked into one of the elongated apertures and having the longitudinal extent of the engagement element 95A perpendicular to the longitudinal extent of the elongated aperture.

There are a number of advantages of the preferred embodiment over the previous prior art U.S. Pat. No. 6,530,729. The assemblies of the present embodiment have pawl which is foot operated by foot pedals to allow release of the tension in the harness so it can be quickly removed from the tire. The winch and chock assembly is also substantially lighter than that in the '729 patent. Because it is light, it is easy to maneuver with one hand when placing it in position adjacent a tire.

Another advantage is that a relatively tall channel on the load platform was required in the '729 patent, whereas in the present preferred embodiment, the ribs are substantially shorter than the tall channel of the previous patent. This results in an overall height gain for vehicles loaded on the platform.

The present preferred embodiment allows for lateral adjustment of a placement of the chock based on increments of the distance between the ribs. With the previous '729 patent design, a single channel was provided for each chock assembly and therefore if the chock assembly were to utilize the next adjacent channel it would have to be laterally moved a substantial distance. With the present embodiment, the chock assembly can be moved and repositioned based on the distance between the ribs which is a smaller distance than in the aforesaid patent because three ribs are used for each chock assembly rather than a single track as in the previous patent. Also with respect to longitudinal adjustment on the platform, since the slots in the ribs are placed close together, a smaller step distance is provided as opposed to the '729 patent where the slots in the tracks are provided at a greater spacing in the longitudinal direction and thus only a more coarse longitudinal placement adjustment was possible in the prior '729 patent.

Although a particular configuration has been shown for the tire harness, other configurations may be employed by those skilled in the art having free ends. It is possible that a web loop or folded over end could be provided at one or both ends. If a web loop is used, the mandrel could pass through the web loop.

According to the method and system of the preferred embodiment, the vehicle is first positioned on the platform 10. Then the right and left hand winch and chock assemblies 12 and 12' are positioned opposite respective ends of the tire such that the respective curved chock surfaces 41 abut or closely abut the tire. The winch and chock assemblies are then locked to the respective ribs 15A, 15B, 15C by turning the respective lock mechanisms 18 with the hooks 17A, 17B, 17C engaged in the respective elongated apertures 15AB, 15BB, 15BC. Thereafter, if the end 31 or 39 of the tire harness has not been engaged with the respective winch and chock assembly, this is then done. Thereafter, the other end of the web is inserted through the slot of the mandrel of the other winch and chock assembly. Then at least the winch and chock assembly receiving the free end is rotated so that the harness end tightens down on itself by an over-wrap. Thereafter, either one or both of the winch and chock assemblies are utilized by turning their respective mandrels to tighten the tire harness on the wheel. If desired, additional tires of the vehicle may be secured in a similar fashion.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

I claim as my invention:

1. A method for tying down at least one tire of a vehicle on a load carrying platform, comprising the steps of:
   providing at least two raised ribs at the platform, each of said ribs having a plurality of elongated completely closed retaining apertures at a top surface and a respective downwardly depending side wall at each opposing side edge of said top surface;
   providing at least one winch and chock assembly supported by said top surface of each of said at least two ribs, said assembly comprising a winch, a chock surface, a rotating lock mechanism with an elongated lock element which in an insertion position fits within one of the apertures in one of the two ribs and in a locking position has its longitudinal extent substantially perpendicular to a longitudinal extent of the elongated aperture to engage the aperture, and at least one hook engageable; in another of the elongated apertures of one of the two ribs at the platform;
   positioning the at least one chock assembly with the chock surface adjacent one end of the tire, and engaging the lock element and the hook with the respective elongated apertures;
   connecting one end of a tire harness to a winch and securing the other end of the tire harness; and
   tightening the harness on the tire with the winch.

2. The method of claim 1 including the step of providing the winch with a foot operated pawl assembly which releases a tension on the tire harness when the pawl assembly is activated by a person's foot.

3. The method of claim 1 wherein the rotating lock mechanism is spring-loaded so that it is normally biased to said locking position.

4. The method of claim 1 wherein at least three of said raised ribs are provided and at least two of said hooks are provided, and wherein the lock element engages in an elongated slot of a central one of said three ribs and the at least two hooks engage in respective elongated apertures of the respective ribs lying to both sides of the central rib.

5. The method of claim 4 wherein three hooks are provided engaging with respective elongated apertures of the three raised ribs.

6. The method of claim 1 wherein the load carrying platform is on a railcar.

7. The method of claim 1 wherein another winch and chock assembly is provided which is positioned at an end of the tire opposite the one winch and chock assembly and wherein an opposite end of said tire harness opposite said one end connects to said another winch and chock assembly.

8. The method of claim 1 wherein an end of the tire harness opposite said one end is an engagement member engageable in at least one of the elongated apertures of one of said ribs.

9. The method of claim 8 wherein the engagement member comprises a T-shaped hook.

10. A vehicle tire tie-down winch and chock assembly for tying down at least one tire of a vehicle on a load carrying platform with a tire harness, said load carrying platform having associated therewith at least two raised ribs with elongated completely closed apertures at a top surface of each of the ribs, each of said rib top surfaces having a respective downwardly depending side wall at each opposing side edge of said top surface, and each of said elongated apertures being complete closed, comprising:
   a casing having a bottom, said bottom being shaped and dimensioned to be supported by the respective top surfaces of each of the at least two raised ribs, said casing also having a chock surface;
   a rotating lock mechanism at said bottom with an elongated lock element which in an insertion position fits within one of the completely closed elongated apertures in one of the ribs and in a locking position has its longitudinal extent substantially perpendicular to a longitudinal extent of the elongated aperture to engage the apertures;
   at least one hook engageable in another of the elongated apertures of one of the ribs; and
   a winch in said casing which secures to one end of the tire harness.

11. The assembly of claim 10 wherein the winch has a pawl assembly with a foot pedal.

12. The assembly of claim 10 wherein three of said hooks are provided for engagement in elongated apertures of three respective different ribs.

13. The assembly of claim 10 wherein the lock mechanism is spring-loaded such that the elongated lock element is biased to said locking position and a hand operated lever is provided to move said elongated lock element to said insertion position against a spring force of said spring.

14. The assembly of claim 11 wherein a casing is provided on the assembly, the casing having said chock surface, and the foot pedal protrudes through at least one side wall of the casing.

15. The assembly of claim 11 wherein the pawl assembly comprises a foot bar with one end of the foot bar comprising said foot pedal, and an opposite end of the foot bar from said foot pedal comprising another foot pedal.

16. The assembly of claim 10 wherein the winch has a mandrel with a slot which receives said one end of the tire harness such that when the mandrel is rotated a portion of the tire harness wraps over said one end.

17. The assembly of claim 10 wherein the winch has a mandrel, and the tire harness one end is engageable with the mandrel of the winch.

18. The assembly of claim 10 wherein a second winch and chock assembly is provided positionable at an end of the tire opposite where the first winch and chock assembly is positioned, and wherein the tire harness has an opposite end from said one end engageable with a winch of said second winch and chock assembly.

19. The assembly of claim 10 wherein a T-shaped hook is provided connectible to an end of the tire harness opposite said one end, the T-shaped hook being shaped to engage with an elongated aperture of one of said ribs.

20. A railcar vehicle tire tie-down system for tying down at least one tire of a vehicle on a load carrying platform of the railcar, comprising:
    said load carrying platform having associated therewith at least two raised ribs each with a plurality of completely closed elongated retaining apertures at a top surface of each of the ribs, each top surface having at opposing side edges a respective downwardly depending side wall;
    a tire harness having first and second ends;
    at least one winch and chock assembly having a bottom surface supported by the respective top surface of each of said at least two raised ribs, said bottom surface having at least one hook therein engageable with a respective aperture of a respective rib and also a rotating lock mechanism with an elongated lock element positioned also at said bottom surface which in an insertion position fits within a respective aperture of one of the ribs and in a locking position has its longitudinal extent substantially perpendicular to a longitudinal extent of the elongated aperture, and the assembly for receiving said one end of the tire harness also having a winch including a cooperating pawl assembly with a foot pedal; and
    a retention member for securing the tire harness second end to the load carrying platform.

21. The A system of claim 20 wherein the platform has at least three ribs, and three hooks are provided at said bottom surface of the assembly positioned for engagement in respective elongated slots of respective ones of said three ribs.

22. The assembly of claim 20 wherein said retention member comprises a second of said winch and chock assemblies.

* * * * *